US008996360B2

(12) United States Patent　　　(10) Patent No.: US 8,996,360 B2
Dong et al.　　　　　　　　　　　(45) Date of Patent: Mar. 31, 2015

(54) METHOD AND APPARATUS FOR GENERATING JOURNAL

(71) Applicant: Huawei Technologies Co., Ltd., Shenzhen (CN)

(72) Inventors: Zhenhua Dong, Shenzhen (CN); Gong Zhang, Shenzhen (CN); Liangwei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/315,535

(22) Filed: Jun. 26, 2014

(65) Prior Publication Data

US 2015/0006152 A1　　Jan. 1, 2015

(30) Foreign Application Priority Data

Jun. 26, 2013　(CN) .......................... 2013 1 0260039

(51) Int. Cl.
*G06F 17/27*　　(2006.01)
*G06F 17/28*　　(2006.01)

(52) U.S. Cl.
CPC .......... *G06F 17/277* (2013.01); *G06F 17/2818* (2013.01); *G06F 17/2827* (2013.01); *G06F 17/2881* (2013.01); *G06F 17/28* (2013.01)
USPC ....... 704/9; 704/1; 704/10; 704/251; 704/257

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC ........................................ 704/1–10, 251, 257
See application file for complete search history.

(56) References Cited

U.S. PATENT DOCUMENTS 6,324,336 B1 * 11/2001 Kanda ........................... 386/282
7,827,297 B2 * 11/2010 Kristjansson ................. 709/231
(Continued)

FOREIGN PATENT DOCUMENTS

CN　　1573741 A　　2/2005
CN　　1608259 A　　4/2005
(Continued)

OTHER PUBLICATIONS

Zong, C., "Statistical Natural Language Processing," May 2008, 7 pages.
(Continued)

*Primary Examiner* — Lamont Spooner
(74) *Attorney, Agent, or Firm* — Conley Rose, P.C.; Grant Rodolph

(57) ABSTRACT

A method and an apparatus for generating a journal, which can implement automatic generation of a journal based on data from various sources. The method includes: obtaining a source data set and a journal description data set corresponding to the source data set; calculating an alignment probability between each source data sequence and each journal description data sequence to obtain an alignment probability set; calculating a probability that each journal description data sequence occurs in the journal description data set to obtain an occurrence probability set; determining, according to the alignment probability set and the occurrence probability set and from each journal description data sequence, a target journal description data sequence corresponding to a source data sequence to be translated, and translating the target journal description data sequence into a journal description text.

18 Claims, 5 Drawing Sheets

(56) References Cited

U.S. PATENT DOCUMENTS

| | | | |
|---|---|---|---|
| 2004/0243422 A1* | 12/2004 | Weber et al. | 705/1 |
| 2005/0015240 A1 | 1/2005 | Appleby | |
| 2008/0015842 A1* | 1/2008 | Moore | 704/4 |
| 2008/0109418 A1 | 5/2008 | Shapiro et al. | |
| 2008/0300857 A1 | 12/2008 | Barbaiani et al. | |
| 2008/0306725 A1* | 12/2008 | Moore | 704/2 |
| 2009/0322533 A1* | 12/2009 | Bomba et al. | 340/572.1 |
| 2010/0246789 A1* | 9/2010 | Vance et al. | 379/201.01 |
| 2010/0250672 A1* | 9/2010 | Vance et al. | 709/204 |
| 2010/0291950 A1* | 11/2010 | Lin et al. | 455/456.3 |
| 2011/0311205 A1* | 12/2011 | McClanahan et al. | 386/296 |
| 2012/0114132 A1* | 5/2012 | Abrahamsson et al. | 381/74 |
| 2012/0166484 A1* | 6/2012 | McGregor | 707/776 |
| 2012/0170905 A1* | 7/2012 | Brundula | 386/239 |
| 2012/0203540 A1 | 8/2012 | Aue | |
| 2012/0311416 A1* | 12/2012 | Richter et al. | 715/202 |
| 2013/0041857 A1 | 2/2013 | Medlock et al. | |
| 2013/0124984 A1* | 5/2013 | Kuspa | 715/255 |
| 2013/0166303 A1* | 6/2013 | Chang et al. | 704/258 |

FOREIGN PATENT DOCUMENTS

| | | |
|---|---|---|
| CN | 102855263 A | 1/2013 |
| CN | 102893239 A | 1/2013 |
| EP | 1489523 A2 | 12/2004 |

OTHER PUBLICATIONS

Zong, C., "Statistical Natural Language Processing," May 2008, English Translation dated Aug. 22, 2014, 5 pages.

Foreign Communication From a Counterpart Application, PCT Application No. PCT/CN2014/071541, International Search Report dated Jun. 4, 2014, 7 pages.

Foreign Communication From a Counterpart Application, PCT Application No. PCT/CN2014/071541, Written Opinion dated Jun. 4, 2014, 4 pages.

\* cited by examiner

METHOD AND APPARATUS FOR GENERATING JOURNAL

CROSS-REFERENCE TO RELATED APPLICATION

This application claims priority to Chinese Patent Application No. 201310260039.2, filed on Jun. 26, 2013, which is hereby incorporated by reference in its entirety.

TECHNICAL FIELD

The present invention relates to the field of information processing technologies, and in particular, to a method and an apparatus for generating a journal.

BACKGROUND

At present, a method for implementing automatic generation of a journal is to manually write a large number of journal generating rules and translation templates, and then translate user activity data recorded by an external device into text description information according to the journal generating rules and the translation templates. Normally, the user activity data may come from a variety of sources. For example, the user activity data may be data collected by a global position system (GPS) sensor, or a user call record that is recorded by a terminal itself, and the like. When sources of the user activity data are different, different rules and translating templates are used to translate the user activity data into text description information.

Therefore, when an existing method for automatically generating a journal is used to implement journal generation, the user activity data from different sources requires different rules and translation templates, and the rules and translation templates need to be written manually; as a result, when user activity data from a new source emerges, the user activity data of a new type cannot be processed by using the existing rule and translation template, which causes poor flexibility in actual use.

SUMMARY

Embodiments of the present invention provide a method and an apparatus for generating a journal, which can implement automatic journal generation based on data from various sources.

To achieve the foregoing objective, the embodiments of the present invention adopt the following technical solutions:

A first aspect provides a method for generating a journal, including: obtaining a source data set and a journal description data set corresponding to the source data set; calculating an alignment probability between each source data sequence in the source data set and each journal description data sequence in the journal description data set to obtain an alignment probability set, where the source data sequence includes at least one piece of source data, and the journal description data sequence includes at least one piece of journal description data; calculating a probability that each journal description data sequence occurs in the journal description data set to obtain an occurrence probability set; determining, according to the alignment probability set and the occurrence probability set and from each journal description data sequence, a target journal description data sequence corresponding to a source data sequence to be translated, where the source data sequence to be translated is any one of the source data sequences; and translating the target journal description data sequence into a journal description text.

With reference to the first aspect, in a first implementation manner of the first aspect, the method further includes: performing lexical processing on the source data in the source data set to obtain lexically processed source data; and performing lexical processing on the journal description data in the journal description data set to obtain lexically processed journal description data.

With reference to the first implementation manner of the first aspect, in a second implementation manner of the first aspect, the calculating an alignment probability between each source data sequence in the source data set and each journal description data sequence in the journal description data set to obtain the alignment probability set includes: constructing a pair of parallel texts from a source data set and a journal description data set within a same preset period of time, where a pair of parallel texts is expressed as (S_all, T_all): S_all represents a source data set in the pair of parallel texts, and S_all=G1, ..., Gm, where G1 represents a first piece of lexically processed source data in S_all, Gm represents an $m^{th}$ lexically processed source data in S_all, and m is the number of pieces of lexically processed source data in the source data set; and T_all represents a journal description data set in the pair of parallel texts and T_all=A1, ..., An, where A1 represents a first piece of lexically processed journal description data, An represents an $n^{th}$ piece of lexically processed journal description data, and n is the number of pieces of lexically processed journal description data in the journal description data set; and calculating an alignment probability between each source data sequence and a journal description data sequence respectively corresponding to each source data sequence to obtain an alignment probability set, where the source data sequence includes at least one piece of lexically processed source data in S_all, and the journal description data sequence includes at least one piece of lexically processed journal description data in T_all.

With reference to the first implementation manner of the first aspect, in a third implementation manner of the first aspect, the calculating a probability that each journal description data sequence occurs in the journal description data set to obtain an occurrence probability set includes calculating the probability that each journal description data sequence occurs in the journal description data set to obtain the occurrence probability set, where the journal description data sequence includes at least one piece of the lexically processed journal description data in the journal description data set.

With reference to any one of the foregoing implementation manners of the first aspect, in a fourth implementation manner of the first aspect, the determining, according to the alignment probability set and the occurrence probability set and from each journal description data sequence, a target journal description data sequence corresponding to a source data sequence to be translated includes searching the alignment probability set for each P(S|T) and the occurrence probability set for each P(T), where P(S|T) is an alignment probability between a source data sequence S and a journal description data sequence T, and P(T) is an occurrence probability of the journal description data sequence T in the journal description set; and when S is the source data sequence to be translated, determining that T is the target journal description data sequence which causes P(S|T)×P(T) to reach a maximum value.

With reference to any one of the foregoing implementation manners of the first aspect, in a fifth implementation manner of the first aspect, the translating the target journal description data sequence into a journal description text includes generating, according to time identifiers included in different types of data sequences to be translated, the journal description text from each target journal description data sequence obtained according to the different types of data sequences to be translated.

A second aspect provides an apparatus for generating a journal, including: an obtaining module configured to obtain a source data set and a journal description data set corresponding to the source data set; a calculating module configured to calculate an alignment probability between each source data sequence in the source data set and each journal description data sequence in the journal description data set to obtain an alignment probability set, where the source data sequence includes at least one piece of source data, and the journal description data sequence includes at least one piece of journal description data; where the calculating module is further configured to calculate a probability that each journal description data sequence occurs in the journal description data set to obtain an occurrence probability set; a translating module configured to determine, according to the alignment probability set and the occurrence probability set and from each journal description data sequence, a target journal description data sequence corresponding to a source data sequence to be translated, where the source data sequence to be translated is any one of the source data sequences; and a journal generating module configured to generate a journal description text according to the target journal description data sequence.

With reference to the second aspect, in a first implementation manner of the second aspect, the apparatus further includes: a lexical processing module configured to perform lexical processing on the source data in the source data set to obtain lexically processed source data; where the lexical processing module is further configured to perform lexical processing on the journal description data in the journal description data set to obtain lexically processed journal description data.

With reference to the first implementation manner of the second aspect, in a second implementation manner of the second aspect, the calculating module is further configured to construct a pair of parallel texts from a source data set and a journal description data set within a same preset period of time, where a pair of parallel texts is expressed as (S_all, T_all): S_all represents a source data set in the pair of parallel texts and S_all=G1, ..., Gm, where G1 represents a first piece of lexically processed source data in S_all, Gm represents an $m^{th}$ lexically processed source data in S_all, and m is the number of pieces of lexically processed source data in the source data set; and T_all represents a journal description data set in the pair of parallel texts and T_all=A1, ..., An, where A1 represents a first piece of lexically processed journal description data, An represents an $n^{th}$ piece of lexically processed journal description data, and n is the number of pieces of lexically processed journal description data in the journal description data set; and calculating an alignment probability between each source data sequence and a journal description data sequence respectively corresponding to each source data sequence to obtain an alignment probability set, where the source data sequence includes at least one piece of lexically processed source data in S_all, and the journal description data sequence includes at least one piece of lexically processed journal description data in T_all.

With reference to the first implementation manner of the second aspect, in a third implementation manner of the second aspect, the calculating module is further configured to calculate a probability that each journal description data sequence occurs in the journal description data set to obtain an occurrence probability set, where the journal description data sequence includes at least one piece of the lexically processed journal description data in the journal description data set.

With reference to any one of the foregoing implementation manners of the second aspect, in a fourth implementation manner of the second aspect, the translating module is further configured to search the alignment probability set for each P(S|T) and the occurrence probability set for each P(T), where P(S|T) is an alignment probability between a source data sequence S and a journal description data sequence T, and P(T) is an occurrence probability of the journal description data sequence T in the journal description set; and when S is the source data sequence to be translated, determine that T is the target journal description data sequence which causes P(S|T)×P(T) to reach a maximum value.

With reference to any one of the foregoing implementation manners of the second aspect, in a fifth implementation manner of the second aspect, the journal generating module is further configured to generate, according to time identifiers included in different types of data sequences to be translated, the journal description text from each target journal description data sequence obtained according to the different types of data sequences to be translated.

A third aspect provides an apparatus for generating a journal, including a processor and a memory, where the processor is configured to obtain a source data set and a journal description data set corresponding to the source data set; the processor is further configured to calculate an alignment probability between each source data sequence in the source data set and each journal description data sequence in the journal description data set to obtain an alignment probability set, where the source data sequence includes at least one piece of source data, and the journal description data sequence includes at least one piece of journal description data; the processor is further configured to calculate a probability that each journal description data sequence occurs in the journal description data set to obtain an occurrence probability set; the processor is further configured to determine, according to the alignment probability set and the occurrence probability set and from each journal description data sequence, a target journal description data sequence corresponding to a source data sequence to be translated, where the source data sequence to be translated is any one of the source data sequences; the processor is further configured to generate a journal description text according to the target journal description data sequence; and the memory is configured to store program code for the processor to implement the foregoing functions.

With reference to the third aspect, in a first implementation manner of the third aspect, the processor is further configured to perform lexical processing on the source data in the source data set to obtain lexically processed source data; and the processor is further configured to perform lexical processing on the journal description data in the journal description data set to obtain lexically processed journal description data.

With reference to the first implementation manner of the third aspect, in a second implementation manner of the third aspect, the processor is further configured to construct a pair of parallel texts from a source data set and a journal description data set within a same preset period of time, where a pair of parallel texts is expressed as (S_all, T_all): S_all represents a source data set in the pair of parallel texts and S_all= G1, ..., Gm, where G1 represents a first piece of lexically processed source data in S_all, Gm represents an $m^{th}$ lexically processed source data in S_all, and m is the number of pieces of lexically processed source data in the source data set; and T_all represents a journal description data set in the pair of parallel texts and T_all=A1, ..., An, where A1 represents a first piece of lexically processed journal description data, An represents an $n^{th}$ piece of lexically processed journal description data, and n is the number of pieces of lexically processed journal description data in the journal description data set; and calculate an alignment probability between each source data sequence and a journal description data sequence respectively corresponding to each source data sequence to obtain an alignment probability set, where the source data sequence includes at least one piece of lexically processed source data in S_all, and the journal description data sequence includes at least one piece of lexically processed journal description data in T_all.

With reference to the first implementation manner of the third aspect, in a third implementation manner of the third aspect, the processor is further configured to calculate a probability that each journal description data sequence occurs in the journal description data set to obtain the occurrence probability set, where the journal description data sequence includes at least one piece of the lexically processed journal description data in the journal description data set.

With reference to any one of the foregoing implementation manners of the third aspect, in a fourth implementation manner of the third aspect, the processor is further configured to search the alignment probability set for each P(S|T) and the occurrence probability set for each P(T), where P(S|T) is an alignment probability between a source data sequence S and a journal description data sequence T, and P(T) is an occurrence probability of the journal description data sequence T in the journal description set; and when S is the source data sequence to be translated, determine that T is the target journal description data sequence which causes P(S|T)×P(T) to reach a maximum value.

With reference to any one of the foregoing implementation manners of the third aspect, in a fifth implementation manner of the third aspect, the processor is further configured to generate, according to time identifiers included in different types of data sequences to be translated, the journal description text from each target journal description data sequence obtained according to the different types of data sequences to be translated.

In embodiments of the present invention, an alignment probability between each source data sequence in a source data set and each journal description data sequence in a journal description data set is calculated to obtain an alignment probability set; a probability that each journal description data sequence occurs in the journal description data set is calculated to obtain an occurrence probability set; then, a target journal description data sequence corresponding to the source data sequence to be translated is determined according to the alignment probability set and the occurrence probability set and from each journal description data sequence, where the source data sequence to be translated is any one of the source data sequences; and the target journal description data sequence is translated into a journal description text. Compared with the prior art, the present invention avoids a problem of poor flexibility in actual use because a new data type cannot be processed when a journal is automatically generated based on a rule in the prior art. In the embodiments of the present invention, automatic generation of a journal is implemented on the basis of the alignment probability set and the occurrence probability set, which has no limit on a type of source data. That is, automatic generation of a journal may be implemented based on various different types of source data. The method and apparatus provided by the embodiment of the present invention has good extensibility in actual use.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
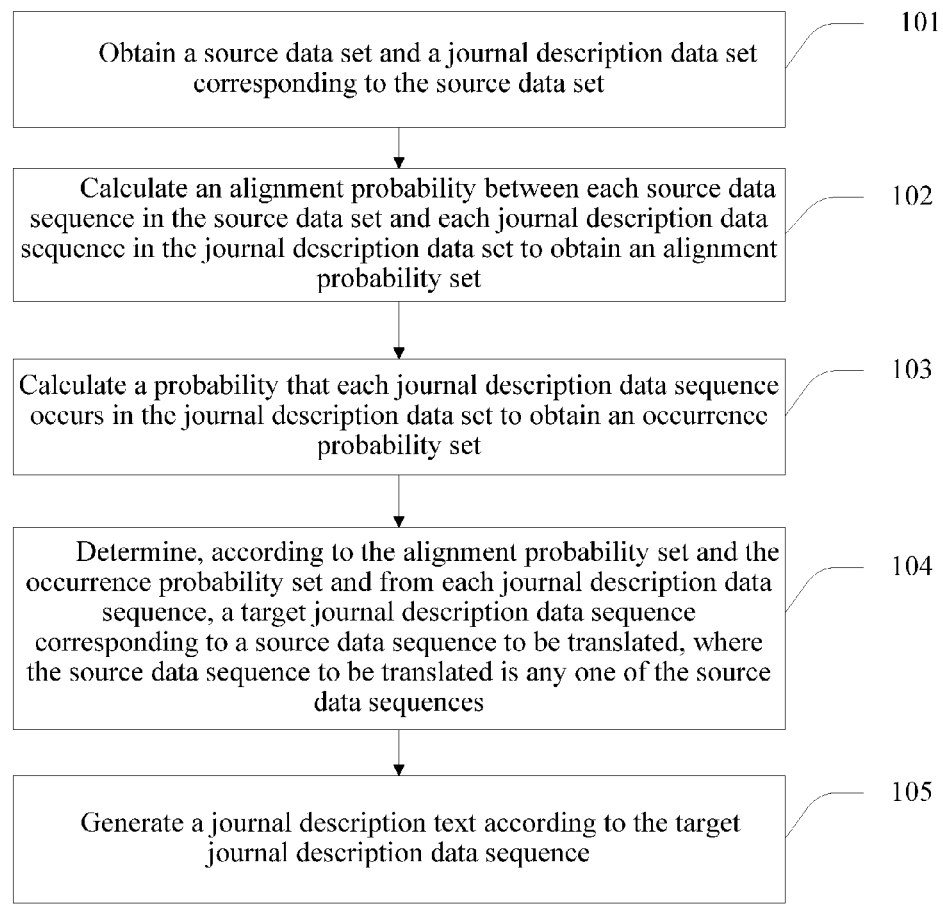
FIG. 1A is a flowchart of a method for generating a journal according to an embodiment of the present invention.

An embodiment of the present invention provides a method for generating a journal, including the following shown in FIG. 1A:

101. Obtain a source data set and a journal description data set corresponding to the source data set.

The obtaining a source data set may be obtaining data acquired by various sensors, for example, acceleration data acquired by an acceleration sensor, GPS data acquired by a GPS sensor, and orientation data acquired by an orientation sensor; and may also be obtaining information about a use condition of a user, for example, call information, an short message, and use information about each application on a terminal.

Different types of source data in the source data set are represented by using different data representation forms.

For example, the acceleration data acquired by the acceleration sensor may be represented by using a tuple [data acquisition time, x-axis acceleration, y-axis acceleration, z-axis acceleration]. For another example, the GPS data acquired by the GPS sensor may be represented by using a tuple [data acquisition time, longitude, latitude, height]. For another example, the acquired call information, for example, call start time, call end time, call duration, calling party, called party, and call waiting time for an unanswered call, may be represented by using a tuple [data acquisition time, local mobile phone state, peer mobile phone state, local mobile phone setting state, peer mobile phone identification (ID)], for example, [call time, call receiving, calling, ringing of mobile phone, peer mobile phone ID].

There may be multiple data representation forms of the source data, where the embodiment of the present invention lists only the foregoing tuple-based representation forms. Certainly, another data representation form may also be used, which is not limited herein.

The journal description data set corresponding to the source data set may be set manually in advance. For example, the source data set includes the GPS data; accordingly, the corresponding journal description data set may be set in advance to be activity description, location information, or the like of a user. The user's activity description may be, for example, "I was at work", "went to the park for lunch", "I was at home", and the like; and the location information may be, for example, "office", "park", and "home".

Journal description data in the journal description data set may be a paragraph, a sentence, or a word.

102. Calculate an alignment probability between each source data sequence in the source data set and each journal description data sequence in the journal description data set to obtain an alignment probability set.

The source data sequence includes at least one piece of source data, and the journal description data sequence includes at least one piece of journal description data.

For example, the alignment probability between each source data sequence and the journal description data sequence respectively corresponding to each source data sequence may be calculated by using an alignment probability in International Business Machines (IBM) translation model 2, so as to obtain the alignment probability set.

Certainly, in addition to the alignment probability in the IBM translation model 2, a statistical machine translation method such as a syntax translation model, a phrase translation model, or a maximum entropy translation model may also be used.

103. Calculate a probability that each journal description data sequence occurs in the journal description data set to obtain an occurrence probability set.

For example, the probability that each journal description data sequence occurs in the journal description data set may be calculated by using a maximum likelihood estimation method, so as to obtain the occurrence probability set.

It should be noted that, in this step, the maximum likelihood estimation method may be used to calculate the probability that each journal description data sequence occurs in the journal description data set; in addition, a Bayesian estimation method, a maximum posterior probability estimation method, or the like, may also be used, which is not limited herein.

104. Determine, according to the alignment probability set and the occurrence probability set and from each journal description data sequence, a target journal description data sequence corresponding to a source data sequence to be translated, where the source data sequence to be translated is any one of the source data sequences.

105. Generate a journal description text according to the target journal description data sequence.

In the embodiment of the present invention, an alignment probability between each source data sequence in the source data set and each journal description data sequence in the journal description data set is calculated to obtain an alignment probability set; a probability that each journal description data sequence occurs in the journal description data set is calculated to obtain an occurrence probability set; then, a target journal description data sequence corresponding to a source data sequence to be translated is determined according to the alignment probability set and the occurrence probability set and from each journal description data sequence, where the source data sequence to be translated is any one of the source data sequences; and the target journal description data sequence is translated into a journal description text. Compared with the prior art, the present invention avoids a problem of poor flexibility in actual use because a new data type cannot be processed when a journal is automatically generated based on a rule in the prior art. In the embodiment of the present invention, automatic generation of a journal is implemented on the basis of the alignment probability set and the occurrence probability set, which has no limit on a type of source data. That is, automatic generation of a journal may be implemented based on various different types of source data. The method provided by the embodiment of the present invention has good flexibility in actual use.

In addition, in the embodiment of the present invention, the automatic generation of a journal is implemented on the basis of the alignment probability set and the occurrence probability set, where the alignment probability set and the occurrence probability set may be obtained by performing model training and learning by using a large amount of training data. A larger amount of training data means a higher accuracy in automatically generating a journal based on the alignment probability set and the occurrence probability set.

Figure 1B:
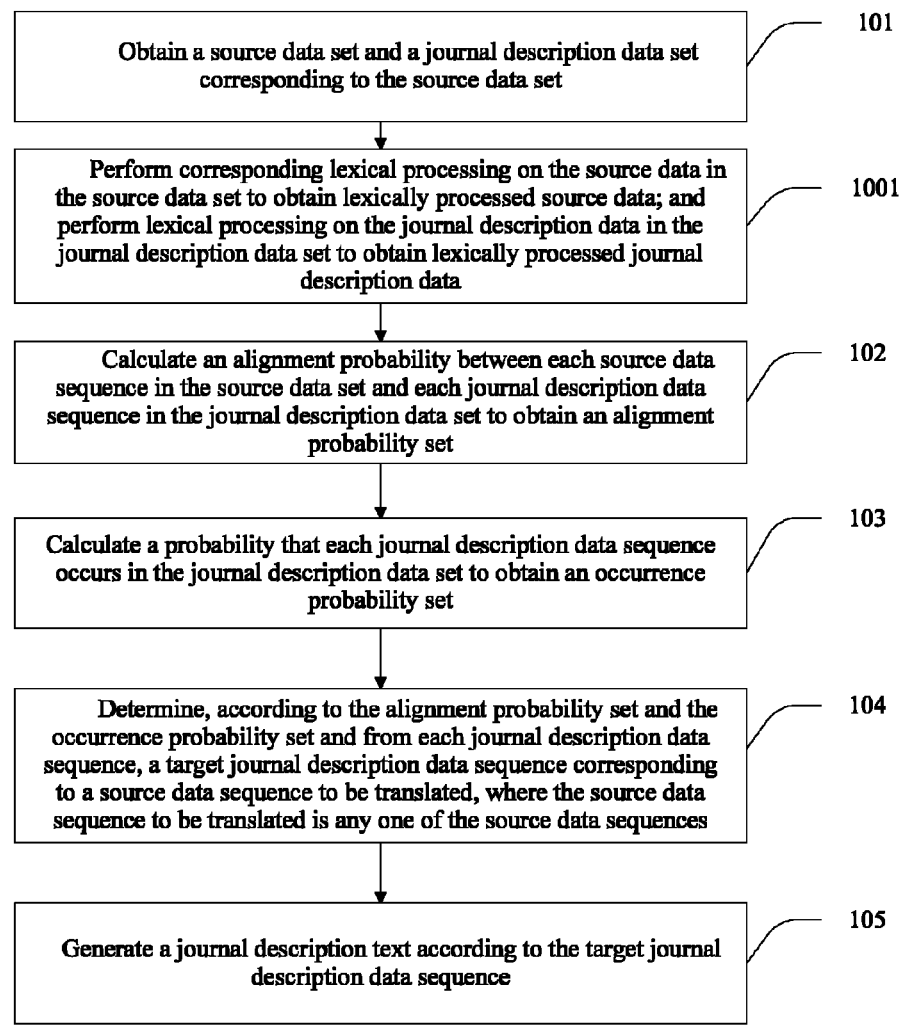
FIG. 1B is a flowchart of a method for generating a journal according to an embodiment of the present invention.

Optionally, as shown in FIG. 1B, before step 102, the method may further include the following step:

1001. Perform corresponding lexical processing on the source data in the source data set to obtain lexically processed source data; and perform lexical processing on the journal description data in the journal description data set to obtain lexically processed journal description data.

The following describes the step of performing corresponding lexical processing on the source data in the source data set to obtain lexically processed source data by using GPS data as an example.

For example, clustering processing is performed on the GPS data in the source data set, so that GPS data within a short distance is classified into one cluster, where the corresponding lexical processing may be the clustering processing by using a space partitioning method.

For example, GPS data corresponding to positions within a range of 100 meters (m)×100 m is collectively expressed as a GPS cluster, and processed source data is a GPS cluster ID corresponding to each piece of GPS data within the range of 100 m×100 m, which is expressed as, for example, GPS 1, GPS 2, . . . , GPS M, where M is a GPS cluster ID.

The performing lexical processing on the journal description data in the journal description data set to obtain the lexically processed journal description data is described by using an example where the journal description data is user activity description.

Assume that the journal description data in the journal description data set is a paragraph "I toured the Great Wall at Badaling, I was at work, I went to the park to see flowers, and I went back home"; corresponding lexical processing may be Chinese word segmentation processing performed on the journal description data in the journal description data set to obtain processed journal description data "I toured the Great Wall at Badaling", "I was at work", "I went to the park to see flowers", and "I went back home".

Certainly, according to different requirements of practical applications, the corresponding lexical processing may also be phrase extraction on the journal description data in the journal description data set. For example, the journal description data in the journal description data set is several sentences: "I had a meal at a restaurant", "played a ball game at a court", and "played a game in the evening"; after phrase extraction processing is performed, "had a meal", "played a ball game", and "played a game" may be obtained.

It should be noted that the lexical processing is mainly used to change a sentence, for example, perform Chinese word segmentation on one sentence, extract a phrase from one sentence, or the like. It may be understood that if data before lexical processing is already one word, corresponding lexical processing operation may not be performed.

Further, in step 102, the calculating an alignment probability between each source data sequence in the source data set and each journal description data sequence in the journal description data set to obtain an alignment probability set may be further implemented in the following manner:

Firstly, construct a pair of parallel texts from a source data set and a journal description data set within a same preset period of time.

A pair of parallel texts is expressed as (S_all, T_all): S_all represents a source data set in the pair of parallel texts and S_all=G1, . . . , Gm, where G1 represents a first piece of lexically processed source data in S_all, Gm represents an $m^{th}$ lexically processed source data in S_all, and m is the number of pieces of lexically processed source data in the source data set; and T_all represents a journal description data set in the pair of parallel texts and T_all=A1, . . . , An, where A1 represents a first piece of lexically processed journal description data, An represents an $n^{th}$ piece of lexically processed journal description data, and n is the number of pieces of lexically processed journal description data in the journal description data set.

For example, the source data set is GPS data obtained by performing the lexical processing on GPS data of the user on a first day, and is expressed as S1_all=GPS 1, . . . , GPS m; the journal description data set is activity data description of the user on the first day corresponding to S1_all, and is expressed as T1_all=Activity 1, . . . , Activity n. A pair of parallel texts may be constructed based on the source data set and the journal description data set on the first day, and is expressed as (S1_all, T1_all).

Similarly, (S2_all, T2_all) may also be constructed, where S2_all represents a source data set on a second day and T2_all represents a journal description data set corresponding to S2_all. By analogy, a parallel corpus may be constructed by using a source data set and a journal description data set of N days, which is expressed as ST={(S1_all, T1_all), (S2_all, T2_all) . . . (Sn_all, Tn_all)}.

Then, calculate an alignment probability between each source data sequence and a journal description data sequence respectively corresponding to each source data sequence to obtain an alignment probability set.

In this step, specifically, the alignment probability between each source data sequence and the journal description data sequence respectively corresponding to each source data sequence may be calculated by using an alignment probability in the IBM translation model 2, so as to obtain the alignment probability set.

The source data sequence includes at least one piece of lexically processed source data in S_all, and the journal description data sequence includes at least one piece of lexically processed journal description data in T_all.

It should be noted that when the alignment probability in the IBM translation model 2 is used to calculate the alignment probability between each source data sequence and the journal description data sequence respectively corresponding to each source data sequence, the alignment probability between the source data sequence and the journal description data sequence corresponding to the source data sequence is an alignment probability under a specific condition.

The specific condition is expressed as [the source data sequence, the journal description data sequence corresponding to the source data sequence, a position of the source data sequence in the set S_all, a position of the journal description data sequence corresponding to the source data sequence in the set T_all, a length of the set S_all, a length of the set T_all].

To make the alignment probability more comprehensible, a concept of the alignment probability is briefly explained as follows:

In statistical natural language processing, an alignment model (alignment model) is defined as follows:

In a case where S_m is a sentence in a source language with a length of m and T_l is a sentence in a target language with a length of l, there are l×m correspondences between words in T_l and S_m. "Alignment" is determined by the correspondence between words. As a result, an alignment relationship set between S_m and T_l has $2^{l*m}$ types of alignment in total.

For a given sentence pair (S_m|T_l), assume that there is a correspondence between all word pairs $(s_j, t_j)$, where $s_j$ is a word in S_m and $t_j$ is a word in T_l; then, a model for depicting these correspondences is referred to as an alignment model (alignment model).

An "alignment probability" refers to a probability of translating $s_j$ into $t_j$ under a specific condition.

For a more detailed explanation of the alignment probability, reference may be made to the related description in statistical natural language processing.

For ease of understanding, in the embodiment of the present invention, a source data sequence is expressed as S, a journal description data sequence is expressed as T, and an alignment probability between a source data sequence and a journal description data sequence corresponding to the source data sequence is expressed as P(S|T).

For example, there is one pair of parallel texts (S1_all, T1_all), and calculating an alignment probability by using an alignment probability in the IBM translation model 2 is implemented as follows:

Assume that in the parallel texts, a source data set is S1_all=GPS 1, . . . , GPS m, and a journal description data set is T1_all=Activity 1, . . . , Activity n.

When a source data sequence S is GPS 2, a journal description data sequence T is Activity 3, a position of the source data sequence in the set S1_all is 2, a position of the journal description data sequence in the set T1_all is 3, a length of the set S1_all is 12, and a length of the set T1_all is 14, a process of calculating P(S|T) is as follows:

A ratio of {the number of occurrence times of [GPS 2, Activity 3, 2, 3, 12, 14] in a parallel corpus} to {

$$\sum_{X=1}^{M}$$

the number of occurrence times of [GPS 2, Activity 3, X, 3, 12, 14] in the parallel corpus}, where M is the length of the set S_all.

For example, when a value of GPS 2 is (116.45, 39.92) and a value of Activity 3 is "tour", the number of occurrence times of [(116.45, 39.92), "tour", 2, 3, 12, 14] in a parallel corpus ST refers to the number of occurrence times, in the entire parallel corpus, of a case where a length of a journal description data set is 14, a length of a source data set is 12, a position of a journal description data sequence "tour" in the journal description data set is 3, and a position of a source data sequence (116.45, 39.92) is 2.

A sum of occurrence times of [GPS 2, Activity 3, X, 3, 12, 14] refers to the number of occurrence times, in the entire parallel corpus, of a case where the length of the journal description data set is 14, the length of the source data set is 12, the position of the journal description data sequence "tour" in the journal description data set is 3, and the source data sequence (116.45, 39.92) is at an $X^{th}$ position of source data set.

It should be noted that the foregoing source data sequence is described by using one piece of source data as an example. Certainly, the source data sequence may also include two or more pieces of source data, and the journal description data sequence may also include two or more pieces of journal description data.

Reference may be made to the prior art for more detailed implementation of using the alignment probability in the IBM translation model 2 in this step. Certainly, in this step, the alignment probability in the IBM translation model 2 may be used; in addition, a statistical machine translation method such as a syntax translation model, a phrase translation model, or a maximum entropy translation model may also be used.

Further, the calculating a probability that each journal description data sequence occurs in the journal description data set to obtain an occurrence probability set in step 103 includes calculating the probability that each journal description data sequence occurs in the journal description data set to obtain the occurrence probability set, where the journal description data sequence includes at least one piece of the lexically processed journal description data in the journal description data set.

In an actual application, the probability that each journal description data sequence occurs in the journal description data set may be calculated by using, for example, a maximum likelihood estimation method, which is described further with reference to an exemplary example.

For example, the journal description data set is the following three sentences:
(1) JOHN READ HOLY BIBLE
(2) MARK READ A TEXT BOOK
(3) HE READ A BOOK BY DAVID For example, taking calculation where a journal description data sequence T is the sentence (1) as an example, an occurrence probability of the journal description data sequence T in the journal description data set is expressed as P(T); then, a process of calculating P(T) is as follows:

$$P(\text{JOHN READ A BOOK}) = P(\text{JOHN}|\langle BOS\rangle) \times P(\text{READ}|\text{JOHN}) \times$$
$$P(A|\text{READ}) \times P(\text{BOOK}|A) \times$$
$$P(\langle EOS\rangle|\text{BOOK})$$
$$= 1/3 \times 1/1 \times 2/3 \times 1/2 \times 1/2$$
$$= 0.06$$

An existing related technology may be referred to for more detailed implementation of the maximum likelihood estimation.

It should be noted that, in this step, the maximum likelihood estimation method may be used to calculate the probability that each journal description data sequence occurs in the journal description data set; in addition, a Bayesian estimation method, a maximum posterior probability estimation method, or the like, may also be used, which is not limited herein.

After the operations of steps 101 to 103, the alignment probability set and the occurrence probability set may be obtained, where the alignment probability set includes a large amount of P(S|T), and the occurrence probability set includes a large amount of P(T).

Further, in step 104, the determining, according to the alignment probability set and the occurrence probability set and from each journal description data sequence, a target journal description data sequence corresponding to a source data sequence to be translated, where the source data sequence to be translated is any one of the source data sequences includes: searching the alignment probability set for each P(S|T) and the occurrence probability set for each P(T), where P(S|T) is an alignment probability between a source data sequence S and a journal description data sequence T, and P(T) is an occurrence probability of the journal description data sequence T in the journal description data set; and when S is the source data sequence to be translated, determining that T is the target journal description data sequence which causes P(S|T)×P(T) to reach a maximum value.

For example, assume that the alignment probability set obtained after step 102 is as follows:
P(GPS1|"I toured the Great Wall at Badaling")=0.05
P(GPS1|"I was at work")=0.0
P(GPS2|"I was at work")=0.005
P(GPS3|"went to the park for lunch")=0.015
P({GPS2,GPS3}|{"I was at work", "went to the park for lunch"})=0.0005
P(GPS4|"I was at home")=0.015
P(GPS5|"got off work")=0.015
. . . .
P(GPS4|"got off work")=0.0015
P({GPS1, GPS2, GPS3, GPS4}|{"I was at home", "I was at work", "went to the park for lunch", "got off work"})=0.0001
P({GPS1, GPS2, GPS3, GPS4}|{"I was at home", "I was at work", "went to the park to see flowers", "got off work"})=0.00008

Assume that the occurrence probability set obtained after step 103 is as follows:
P("I toured the Great Wall at Badaling")=0.01
P("I was at work")=0.003
P("went to the park for lunch")=0.01
P("I was at home")=0.003
. . . .
P("got off work")=0.0001
P("I was at home", "I was at work", "went to the park for lunch", "got off work")=0.00008
P("I was at home", "I was at work", "went to the park to see flowers", "got off work")=0.0000001

If the source data sequence to be translated is S={GPS 1, GPS 2, GPS 3, GPS 4}, search each P(S|T) in the alignment probability set and each P(T) in the occurrence probability set to find that a journal description data sequence T that causes P(S|T)×P(T) to reach a maximum value is T={"I was at home", "I was at work", "went to the park to see flowers", "got off work"}.

{"I was at home", "I was at work", "went to the park to see flowers", "got off work"} is a target journal description data sequence.

Further, in step 105, the generating a journal description text according to the target journal description data sequence includes generating, according to time identifiers included in different types of data sequences to be translated, the journal description text from each target journal description data sequence obtained according to the different types of data sequences to be translated.

Each piece of source data in the source data sequence to be translated includes a time identifier indicating when acquisition is performed. The source data in the source data sequence to be translated corresponds to the journal description data in the journal description data sequence. Such a correspondence may be that one piece of source data corresponds to one piece of journal description data, multiple pieces of source data correspond to one piece of journal description data, or one piece of source data corresponds to multiple pieces of journal description data. The specific manner of correspondence depends on a practical application. Therefore, multiple target journal description data sequences may be concatenated by using the time identifiers of the source data to form a paragraph of journal description text.

For example, when a data sequence to be translated is acceleration sensor data, a target journal description data sequence obtained by translation is {get up, have meal, go to work, lunch break, work, get off work, go home}.

When a data sequence to be translated is time data, a target journal description data sequence obtained by translation is:

{7:00 am, 7:20 am, 8:00 am, 12:00 pm, 2:00 pm, 6:00 pm}

When a data sequence to be translated is GPS and wireless fidelity (Wifi) data, a target journal description data sequence obtained by translation is:

{home, dining hall, office, park, office, street}

Accordingly, a journal description text finally generated is:

I got up at 7:00 am, left home to have breakfast in the dining hall at 7:20 am, arrived at the office to start work at 8:00 am, went to the park for a lunch break at 12:00 pm, went back to the office to start afternoon work at 2:00 pm, and got off work and went home at 6:00 pm.

Figure 2A:
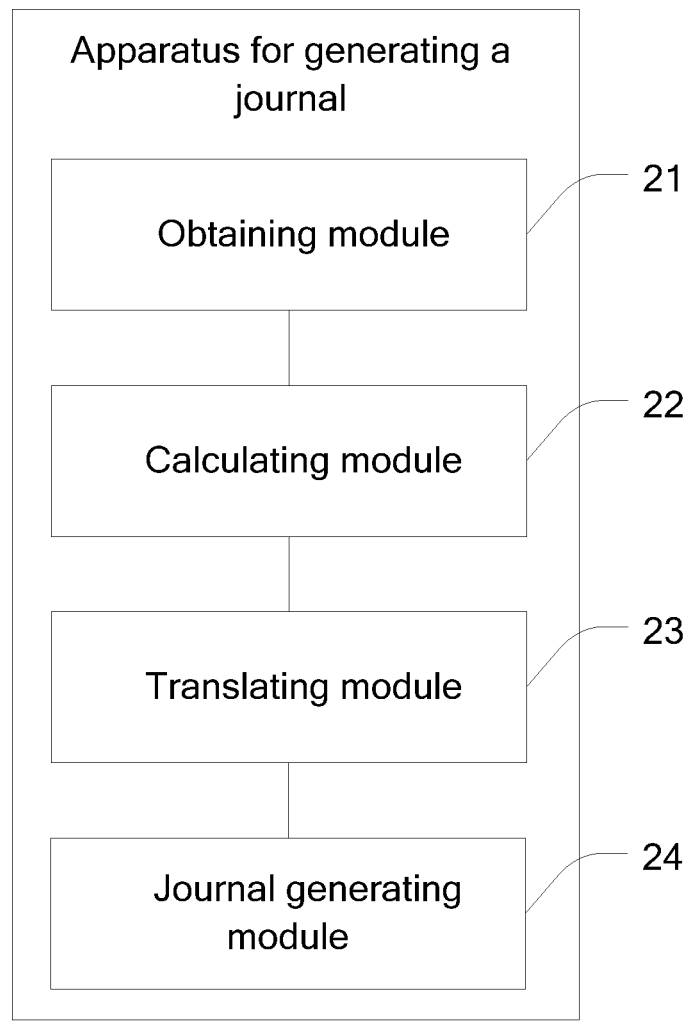
FIG. 2A is a structural diagram of an apparatus for generating a journal according to an embodiment of the present invention.

An embodiment of the present invention provides an apparatus for generating a journal, as shown in FIG. 2A, where the apparatus includes an obtaining module 21, a calculating module 22, a translating module 23, and a journal generating module 24.

The obtaining module 21 is configured to obtain a source data set and a journal description data set corresponding to the source data set.

The obtaining a source data set may be obtaining data acquired by various sensors.

Different types of source data in the source data set are represented by using different data representation forms, for example, source data may be represented by using a tuple. There may be multiple data representation forms of the source data, where the embodiment of the present invention lists only the foregoing tuple-based representation forms. Certainly, another data representation form may also be used, which is not limited herein.

The journal description data set corresponding to the source data set may be set manually in advance. For example, the source data set includes the GPS data; accordingly, the corresponding journal description data set may be set in advance to be activity description, location information, or the like of a user. The user's activity description may be, for example, "I was at work", "went to the park for lunch", "I was at home", and the like; and the location information may be, for example, "office", "park", and "home".

Journal description data in the journal description data set may be a paragraph, a sentence, or a word.

The calculating module 22 is configured to calculate an alignment probability between each source data sequence in the source data set and each journal description data sequence in the journal description data set to obtain an alignment probability set.

The source data sequence includes at least one piece of source data, and the journal description data sequence includes at least one piece of journal description data.

For example, the alignment probability between each source data sequence and the journal description data sequence respectively corresponding to each source data sequence may be calculated by using an alignment probability in the IBM translation model 2, so as to obtain the alignment probability set. Certainly, in addition to the alignment probability in the IBM translation model 2, a statistical machine translation method such as a syntax translation model, a phrase translation model, or a maximum entropy translation model may also be used.

The calculating module 22 is further configured to calculate a probability that each journal description data sequence occurs in the journal description data set to obtain an occurrence probability set.

For example, the calculating module 22 may calculate the probability that each journal description data sequence occurs in the journal description data set by using a maximum likelihood estimation method, so as to obtain the occurrence probability set.

It should be noted that in this step, the maximum likelihood estimation method may be used to calculate the probability that each journal description data sequence occurs in the journal description data set; in addition, a Bayesian estimation method, a maximum posterior probability estimation method, or the like, may also be used, which is not limited herein.

The translating module 23 is configured to determine, according to the alignment probability set and the occurrence probability set and from each journal description data sequence, a target journal description data sequence corresponding to a source data sequence to be translated, where the source data sequence to be translated is any one of the source data sequences.

The journal generating module 24 is configured to generate a journal description text according to the target journal description data sequence.

For function implementation of the apparatus provided by the embodiment of the present invention, reference may be made to the related description of the method for generating a journal.

In the embodiment of the present invention, an alignment probability between each source data sequence in the source data set and each journal description data sequence in the journal description data set is calculated to obtain an alignment probability set; a probability that each journal description data sequence occurs in the journal description data set is calculated to obtain an occurrence probability set; then, a target journal description data sequence corresponding to a source data sequence to be translated is determined according to the alignment probability set and the occurrence probability set and from each journal description data sequence, where the source data sequence to be translated is any one of the source data sequences; and translating the target journal description data sequence into a journal description text. Compared with the prior art, the present invention avoids a problem of poor flexibility in actual use because a new data type cannot be processed when a journal is automatically generated based on a rule in the prior art. In the embodiment of the present invention, automatic generation of a journal is implemented on the basis of the alignment probability set and the occurrence probability set, which has no limit on a type of source data. That is, automatic generation of a journal may be implemented based on various different types of source data. The method provided by the embodiment of the present invention has good flexibility in actual use.

In addition, in the embodiment of the present invention, the automatic generation of a journal is implemented on the basis of the alignment probability set and the occurrence probability set, where the alignment probability set and the occurrence probability set may be obtained by performing model training and learning by using a large amount of training data. A larger amount of training data means a higher accuracy in automatically generating a journal based on the alignment probability set and the occurrence probability set.

Figure 2B:
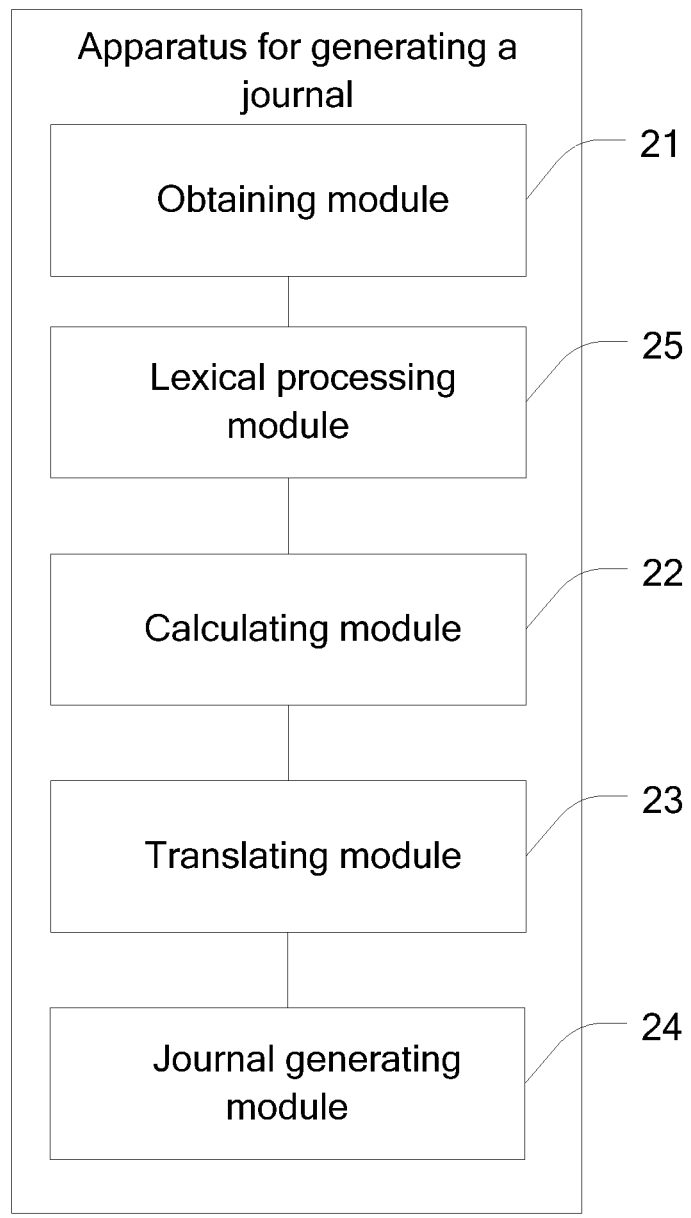
FIG. 2B is a structural diagram of another apparatus for generating a journal according to an embodiment of the present invention.

Optionally, as shown in FIG. 2B, the apparatus for generating a journal further includes a lexical processing module 25 configured to perform lexical processing on the source data in the source data set to obtain lexically processed source data.

For example, clustering processing is performed on the GPS data in the source data set, so that GPS data within a short distance is classified into one cluster, where the corresponding lexical processing may be the clustering processing by using a space partitioning method.

For example, GPS data corresponding to positions within a range of 100 m×100 m is collectively expressed as a GPS cluster, and processed source data is a GPS cluster ID corresponding to each piece of GPS data within the range of 100 m×100 m, which is expressed as, for example, GPS 1, GPS 2, . . . , GPS M, where M is a GPS cluster ID.

The lexical processing module 25 is further configured to perform lexical processing on the journal description data in the journal description data set to obtain lexically processed journal description data.

For example, the journal description data in the journal description data set is a paragraph "I toured the Great Wall at Badaling, I was at work, I went to the park to see flowers, and I went back home"; corresponding lexical processing may be Chinese word segmentation processing performed on the journal description data in the journal description data set to obtain processed journal description data "I toured the Great Wall at Badaling", "I was at work", "I went to the park to see flowers", and "I went back home".

Certainly, according to different requirements of practical applications, the corresponding lexical processing may also be phrase extraction on the journal description data in the journal description data set. For example, the journal description data in the journal description data set is several sentences: "I had a meal at a restaurant", "played a ball game at a court", and "played a game in the evening"; after phrase extraction processing is performed, "had a meal", "played a ball game", and "played a game" may be obtained.

It should be noted that lexical processing is mainly used to change a sentence, for example, perform Chinese word segmentation on one sentence, extract a phrase from one sentence, or the like. It may be understood that if data before lexical processing is already one word, corresponding lexical processing operation may not be performed.

For function implementation of the lexical processing module 25 provided by the embodiment of the present invention, reference may also be made to the related description of steps 1001 to 102 in the method for generating a journal.

Further, in the apparatus for generating a journal, the calculating module 22 is further configured to construct a pair of parallel texts from a source data set and a journal description data set within a same preset period of time.

A pair of parallel texts is expressed as (S_all, T_all).

S_all represents a source data set in the pair of parallel texts and S_all=G1, . . . , Gm, where G1 represents a first piece of lexically processed source data in S_all, Gm represents an $m^{th}$ lexically processed source data in S_all, and m is the number of pieces of lexically processed source data in the source data set; and T_all represents a journal description data set in the pair of parallel texts and T_all=A1, . . . , An, where A1 represents a first piece of lexically processed journal description data, An represents an $n^{th}$ piece of lexically processed journal description data, and n is the number of pieces of lexically processed journal description data in the journal description data set.

For example, the source data set is GPS data obtained by performing the lexical processing on GPS data of the user on a first day, and is expressed as S1_all=GPS 1, . . . , GPS m; the journal description data set is activity data description of the user on the first day corresponding to S_all, and is expressed as T1_all=Activity 1, . . . , Activity n. A pair of parallel texts may be constructed based on the source data set and the journal description data set on the first day, and is expressed as (S1_all, T1_all).

Similarly, (S2_all, T2_all) may also be constructed, where S2_all represents a source data set on a second day and T2_all represents a journal description data set corresponding to S2_all. By analogy, a parallel corpus may be constructed by using a source data set and a journal description data set of N days, which is expressed as ST={(S1_all, T1_all), (S2_all, T2_all) . . . (Sn_all, Tn_all)}.

The calculating module 22 is further configured to calculate an alignment probability between each source data sequence and a journal description data sequence respectively corresponding to each source data sequence to obtain an alignment probability set.

The source data sequence includes at least one piece of lexically processed source data in S_all, and the journal description data sequence includes at least one piece of lexically processed journal description data in T_all.

For example, the calculating module 22 may calculate the alignment probability between each source data sequence and the journal description data sequence respectively corresponding to each source data sequence by using an alignment probability in the IBM translation model 2, so as to obtain the alignment probability set.

When the alignment probability in the IBM translation model 2 is used to calculate the alignment probability between each source data sequence and the journal description data sequence respectively corresponding to each source data sequence, the alignment probability between the source data sequence and the journal description data sequence corresponding to the source data sequence is an alignment probability under a specific condition.

The specific condition is expressed as [the source data sequence, the journal description data sequence corresponding to the source data sequence, a position of the source data sequence in the set S_all, a position of the journal description data sequence corresponding to the source data sequence in the set T_all, a length of the set S_all, a length of the set T_all].

For ease of understanding, in the embodiment of the present invention, a source data sequence is expressed as S, a journal description data sequence is expressed as T, and an alignment probability between a source data sequence and a journal description data sequence corresponding to the source data sequence is expressed as P(S|T).

For example, there is one pair of parallel texts (S1_all, T1_all), and calculating an alignment probability by using an alignment probability in the IBM translation model 2 is implemented as follows:

Assume that in the parallel texts, a source data set is S1_all=GPS 1, . . . , GPS m, and a journal description data set is T1_all=Activity 1, . . . , Activity n.

When a source data sequence S is GPS 2, a journal description data sequence T is Activity 3, a position of the source data sequence in the set S1_all is 2, a position of the journal description data sequence in the set T1_all is 3, a length of the set S1_all is 12, and a length of the set T1_all is 14, a process of calculating P(S|T) is as follows:

A ratio of {the number of occurrence times of [GPS 2, Activity 3, 2, 3, 12, 14] in a parallel corpus} to {

$$\sum_{X=1}^{M}$$

the number of occurrence times of [GPS 2, Activity 3, X, 3, 12, 14] in the parallel corpus}, where M is a length of the set S_all.

For example, when a value of GPS 2 is (116.45, 39.92) and a value of Activity 3 is "tour", the number of occurrence times of [(116.45, 39.92), "tour", 2, 3, 12, 14] in a parallel corpus ST refers to the number of occurrence times, in the entire parallel corpus, of a case where a length of a journal description data set is 14, a length of a source data set is 12, a position of a journal description data sequence "tour" in the journal description data set is 3, and a position of a source data sequence (116.45, 39.92) is 2.

A sum of occurrence times of [GPS 2, Activity 3, X, 3, 12, 14] refers to the number of occurrence times, in the entire parallel corpus, of a case where the length of the journal description data set is 14, the length of the source data set is 12, the position of the journal description data sequence "tour" in the journal description data set is 3, and the source data sequence (116.45, 39.92) is at an $X^{th}$ position of source data set.

For function implementation of the calculating module 22 provided by the embodiment of the present invention, reference may also be made to the related description of step 102 in the method for generating a journal.

Further, in the apparatus for generating a journal, the calculating module 22 is further configured to calculate a probability that each journal description data sequence occurs in the journal description data set to obtain an occurrence probability set.

The journal description data sequence includes at least one piece of lexically processed journal description data in the journal description data set.

In a practical application, the calculating module 22 may calculate the probability that each journal description data sequence occurs in the journal description data set by using, for example, a maximum likelihood estimation method, which is described further with reference to an exemplary example.

For example, the journal description data set is the following three sentences:

(1) JOHN READ HOLY BIBLE
(2) Mark READ A TEXT BOOK
(3) HE READ A BOOK BY DAVID

For example, taking calculation where a journal description data sequence T is the sentence (1) as an example, an occurrence probability of the journal description data sequence T in the journal description data set is expressed as P(T); then, a process of calculating P(T) is as follows:

$$P(\text{JOHN READ A BOOK}) = P(\text{JOHN}|\langle BOS \rangle) \times P(\text{READ}|\text{JOHN}) \times$$
$$P(A|\text{READ}) \times P(\text{BOOK}|A) \times$$
$$P(\langle EOS \rangle|\text{BOOK})$$
$$= 1/3 \times 1/1 \times 2/3 \times 1/2 \times 1/2$$
$$= 0.06$$

For function implementation of the calculating module 22 provided by the embodiment of the present invention, reference may also be made to the related description of step 103 in the method for generating a journal.

Further, in the apparatus for generating a journal, the translating module 23 is further configured to search each P(S|T) in the alignment probability set and each P(T) in the occurrence probability set.

The P(S|T) is an alignment probability between a source data sequence S and a journal description data sequence T, and P(T) is an occurrence probability of the journal description data sequence T in the journal description set.

When S is the source data sequence to be translated, determining that T is the target journal description data sequence which causes P(S|T)×P(T) to reach a maximum value.

For function implementation of the translating module 23 provided by the embodiment of the present invention, reference may also be made to the related description of step 104 in the method for generating a journal.

In the apparatus for generating a journal, the journal generating module 24 is further configured to generate, according to time identifiers included in different types of data sequences to be translated, the journal description text from each target journal description data sequence obtained according to the different types of data sequences to be translated.

Each piece of source data in the source data sequence to be translated includes a time identifier indicating when acquisition is performed. The source data in the source data sequence to be translated corresponds to the journal description data in the journal description data sequence. Such a correspondence may be that one piece of source data corresponds to one piece of journal description data, multiple pieces of source data correspond to one piece of journal description data, or one piece of source data corresponds to multiple pieces of journal description data. The specific manner of correspondence depends on a practical application. Therefore, multiple target journal description data sequences may be concatenated by using the time identifiers of the source data to form a paragraph of journal description text.

For function implementation of the journal generating module 24 provided by the embodiment of the present invention, reference may also be made to the related description of step 105 in the method for generating a journal.

Figure 3:
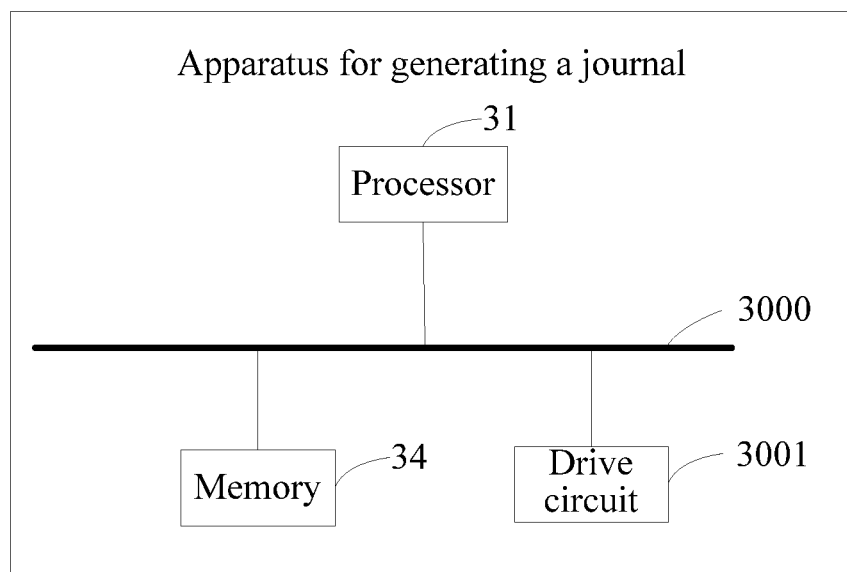
FIG. 3 is a structural diagram of still another apparatus for generating a journal according to an embodiment of the present invention.

An embodiment of the present invention further provides an apparatus for generating a journal, as shown in FIG. 3, where the apparatus includes a processor 31, a memory 34, a bus 3000, and a drive circuit 3001.

The processor 31 is configured to obtain a source data set and a journal description data set corresponding to the source data set.

For example, the obtaining a source data set may be obtaining data acquired by various sensors.

Different types of source data in the source data set are represented by using different data representation forms, for example, source data may be represented by using a tuple. There may be multiple data representation forms of the source data, where the embodiment of the present invention lists only the foregoing tuple-based representation forms. Certainly, another data representation form may also be used, which is not limited herein.

The journal description data set corresponding to the source data set may be set manually in advance. For example, the source data set includes the GPS data; accordingly, the corresponding journal description data set may be set in advance to be activity description, location information, or the like of a user. The user's activity description may be, for example, "I was at work", "went to the park for lunch", "I was at home", and the like; and the location information may be, for example, "office", "park", and "home".

Journal description data in the journal description data set may be a paragraph, a sentence, or a word.

The processor 31 is further configured to calculate an alignment probability between each source data sequence in the source data set and each journal description data sequence in the journal description data set to obtain an alignment probability set, where the source data sequence includes at least one piece of source data, and the journal description data sequence includes at least one piece of journal description data.

The source data sequence includes at least one piece of source data, and the journal description data sequence includes at least one piece of journal description data.

For example, the alignment probability between each source data sequence and the journal description data sequence respectively corresponding to each source data sequence may be calculated by using an alignment probability in the IBM translation model 2, so as to obtain the alignment probability set.

Certainly, in addition to the alignment probability in the IBM translation model 2, a statistical machine translation method such as a syntax translation model, a phrase translation model, or a maximum entropy translation model may also be used.

The processor 31 is further configured to calculate a probability that each journal description data sequence occurs in the journal description data set to obtain an occurrence probability set.

For example, the processor 31 may calculate the probability that each journal description data sequence occurs in the journal description data set by using a maximum likelihood estimation method, so as to obtain the occurrence probability set.

The processor 31 is further configured to determine, according to the alignment probability set and the occurrence probability set and from each journal description data sequence, a target journal description data sequence corresponding to a source data sequence to be translated, where the source data sequence to be translated is any one of the source data sequences.

The processor 31 is further configured to generate a journal description text according to the target journal description data sequence.

The memory 34 is configured to store program code for the processor to implement the foregoing functions.

For function implementation of the apparatus provided by the embodiment of the present invention, reference may be made to the related description of the method for generating a journal.

In the embodiment of the present invention, an alignment probability between each source data sequence in the source data set and each journal description data sequence in the journal description data set is calculated to obtain an alignment probability set; a probability that each journal description data sequence occurs in the journal description data set is calculated to obtain an occurrence probability set; then, a target journal description data sequence corresponding to a source data sequence to be translated is determined according to the alignment probability set and the occurrence probability set and from each journal description data sequence, where the source data sequence to be translated is any one of the source data sequences; and the target journal description data sequence is translated into a journal description text. Compared with the prior art, the present invention avoids a problem of poor flexibility in actual use because a new data type cannot be processed when a journal is automatically generated based on a rule in the prior art. In the embodiment of the present invention, automatic generation of a journal is implemented on the basis of the alignment probability set and the occurrence probability set, which has no limit on a type of source data. That is, automatic generation of a journal may be implemented based on various different types of source data. The apparatus provided by the embodiment of the present invention has good flexibility in actual use.

In addition, in the embodiment of the present invention, the automatic generation of a journal is implemented on the basis of the alignment probability set and the occurrence probability set, where the alignment probability set and the occurrence probability set may be obtained by performing model training and learning by using a large amount of training data. A larger amount of training data means a higher accuracy in automatically generating a journal based on the alignment probability set and the occurrence probability set.

In specific implementation of the embodiment, the memory includes at least one or more of the following memory devices: a read-only memory (ROM), a random access memory (RAM), or a non-volatile random access memory, where the memory provides an instruction and data for the processor.

The processor may be an integrated circuit chip and is capable of processing a signal. In an implementation process, the steps of the foregoing method may be completed by using an integrated logic circuit of hardware or an instruction in a software form in the processor. These instructions may be implemented and controlled with cooperation of the processor therein for performing the method disclosed in the embodiments of the present invention. The processor may also be a universal processor, a digital signal processor (DSP), an application-specific integrated circuit (ASIC), a field programmable gate array (FPGA), or another programmable logic component, separate gate or transistor logic component, or separate hardware component.

The universal processor may be a microprocessor, or the processor may also be any common processor, decoder, or the like. It may be directly embodied that the steps with reference to the method disclosed in the embodiments of the present invention are completed by a hardware processor or a combination of hardware and software modules in the processor. The software module may be located in a mature storage medium in the art, such as a random access memory, a flash memory, a read-only memory, a programmable read-only memory, an electrically erasable programmable read-only memory, or a register.

The drive circuit 3001 is configured to drive each piece of hardware in the apparatus for generating a journal, so that each piece of the hardware can operate normally.

In addition, hardware components of the apparatus for generating a journal are coupled by using a bus system 3000, where the bus system 3000 further includes, besides a data bus, a power source bus, a control bus, and a state signal bus. However, to make description clear, the buses are collectively expressed as the bus system 3000 in FIG. 3.

Optionally, in the apparatus for generating a journal, the processor is further configured to perform lexical processing on the source data in the source data set to obtain lexically processed source data.

For example, clustering processing is performed on the GPS data in the source data set, so that GPS data within a short distance is classified into one cluster, where the corresponding lexical processing may be the clustering processing by using a space partitioning method.

For example, GPS data corresponding to positions within a range of 100 m×100 m is collectively expressed as one GPS category, and source data after processing is a GPS cluster ID corresponding to each piece of GPS data within the range of 100 m×100 m, which is expressed as, for example, GPS 1, GPS 2, ..., GPS M, where M is a GPS cluster ID.

The processor is further configured to perform lexical processing on the journal description data in the journal description data set to obtain lexically processed journal description data.

For example, the journal description data in the journal description data set is a paragraph "I toured the Great Wall at Badaling, I was at work, I went to the park to see flowers, and I went back home"; corresponding lexical processing may be Chinese word segmentation processing performed on the journal description data in the journal description data set to obtain processed journal description data "I toured the Great Wall at Badaling", "I was at work", "I went to the park to see flowers", and "I went back home".

Certainly, according to different requirements of practical applications, the corresponding lexical processing may also be phrase extraction on the journal description data in the journal description data set. For example, the journal description data in the journal description data set is several sentences: "I had a meal at a restaurant", "played a ball game at a court", and "played a game in the evening"; after phrase extraction processing is performed, "had a meal", "played a ball game", and "played a game" may be obtained.

It should be noted that lexical processing is mainly used to change a sentence, for example, perform Chinese word segmentation on one sentence, extract a phrase from one sentence, or the like. It may be understood that if data before lexical processing is already one word, corresponding lexical processing operation may not be performed.

For function implementation of the processor provided by the embodiment of the present invention, reference may also be made to the related description of steps 1001 to 102 in the method for generating a journal.

In the apparatus for generating a journal, the processor is further configured to construct a pair of parallel texts from a source data set and a journal description data set within a same preset period of time. Where a pair of parallel texts is expressed as (S_all, T_all); S_all represents a source data set in the pair of parallel texts and S_all=G1, ..., Gm, where G1 represents a first piece of lexically processed source data in S_all, Gm represents an $m^{th}$ lexically processed source data in S_all, and m is the number of pieces of lexically processed source data in the source data set; and T_all represents a journal description data set in the pair of parallel texts and T_all=A1, ..., An, where A1 represents a first piece of lexically processed journal description data, An represents an $n^{th}$ piece of lexically processed journal description data, and n is the number of pieces of lexically processed journal description data in the journal description data set.

For example, the source data set is GPS data obtained by performing the lexical processing on GPS data of the user on a first day, and is expressed as S1_all=GPS 1, ..., GPS m; the journal description data set is activity data description of the user on the first day corresponding to S_all, and is expressed as T1_all=Activity 1, ..., Activity n. A pair of parallel texts may be constructed based on the source data set and the journal description data set on the first day, and is expressed as (S1_all, T1_all).

Similarly, (S2_all, T2_all) may also be constructed, where S2_all represents a source data set on a second day and T2_all represents a journal description data set corresponding to S2_all. By analogy, a parallel corpus may be constructed by using a source data set and a journal description data set of N days, which is expressed as ST={(S1_all, T1_all), (S2_all, T2_all) ... (Sn_all, Tn_all)}.

The processor is further configured to calculate an alignment probability between each source data sequence and a journal description data sequence respectively corresponding to each source data sequence to obtain an alignment probability set.

The source data sequence includes at least one piece of lexically processed source data in S_all, and the journal description data sequence includes at least one piece of lexically processed journal description data in T_all.

For example, the processor may calculate the alignment probability between each source data sequence and the journal description data sequence respectively corresponding to each source data sequence by using an alignment probability in the IBM translation model 2, so as to obtain the alignment probability set.

When the alignment probability in the IBM translation model 2 is used to calculate the alignment probability between each source data sequence and the journal description data sequence respectively corresponding to each source data sequence, the alignment probability between the source data sequence and the journal description data sequence corresponding to the source data sequence is an alignment probability under a specific condition.

The specific condition is expressed as [the source data sequence, the journal description data sequence corresponding to the source data sequence, a position of the source data sequence in the set S_all, a position of the journal description data sequence corresponding to the source data sequence in the set T_all, a length of the set S_all, a length of the set T_all].

For ease of understanding, in the embodiment of the present invention, a source data sequence is expressed as S, a journal description data sequence is expressed as T, and an alignment probability between a source data sequence and a journal description data sequence corresponding to the source data sequence is expressed as P(S|T).

For example, there is one pair of parallel texts (S1_all, T1_all), and calculating an alignment probability by using an alignment probability in the IBM translation model 2 is implemented as follows:

Assume that in the parallel texts, a source data set is S1_all=GPS 1, ..., GPS m, and a journal description data set is T1_all=Activity 1, ..., Activity n.

When a source data sequence S is GPS 2, a journal description data sequence T is Activity 3, a position of the source data sequence in the set S1_all is 2, a position of the journal description data sequence in the set T1_all is 3, a length of the set S1_all is 12, and a length of the set T1_all is 14, a process of calculating P(S|T) is as follows:

A ratio of {the number of occurrence times of [GPS 2, Activity 3, 2, 3, 12, 14] in a parallel corpus} to {

$$\sum_{X=1}^{M}$$

the number of occurrence times of [GPS 2, Activity 3, X, 3, 12, 14] in the parallel corpus}, where M is the length of the set S_all.

For example, when a value of GPS 2 is (116.45, 39.92) and a value of Activity 3 is "tour", the number of occurrence times of [(116.45, 39.92), "tour", 2, 3, 12, 14] in a parallel corpus ST refers to the number of occurrence times, in the entire parallel corpus, of a case where a length of a journal description data set is 14, a length of a source data set is 12, a position of a journal description data sequence "tour" in the journal description data set is 3, and a position of a source data sequence (116.45, 39.92) is 2.

A sum of occurrence times of [GPS 2, Activity 3, X, 3, 12, 14] refers to the number of occurrence times, in the entire parallel corpus, of a case where the length of the journal description data set is 14, the length of the source data set is 12, the position of the journal description data sequence "tour" in the journal description data set is 3, and the source data sequence (116.45, 39.92) is at an $X^{th}$ position of source data set.

For function implementation of the processor provided by the embodiment of the present invention, reference may also be made to the related description of step 102 in the method for generating a journal.

In the apparatus for generating a journal, the processor is further configured to calculate a probability that each journal description data sequence occurs in the journal description data set to obtain an occurrence probability set.

The journal description data sequence includes at least one piece of lexically processed journal description data in the journal description data set.

In a practical application, the processor may calculate the probability that each journal description data sequence occurs in the journal description data set by using, for example, a maximum likelihood estimation method, which is described further with reference to an exemplary example.

For example, the journal description data set is the following three sentences:
(1) JOHN READ HOLY BIBLE
(2) Mark READ A TEXT BOOK
(3) HE READ A BOOK BY DAVID For example, taking calculation where a journal description data sequence T is the sentence (1) as an example, an occurrence probability of the journal description data sequence T in the journal description data set is expressed as P(T); then, a process of calculating P(T) is as follows:

$$P(\text{JOHN READ A BOOK}) = P(\text{JOHN}|\langle BOS\rangle) \times P(\text{READ}|\text{JOHN}) \times$$
$$P(A|\text{READ}) \times P(\text{BOOK}|A) \times$$
$$P(\langle EOS\rangle|\text{BOOK})$$
$$= 1/3 \times 1/1 \times 2/3 \times 1/2 \times 1/2$$
$$= 0.06$$

It should be noted that; in this step, the maximum likelihood estimation method may be used to calculate the probability that each journal description data sequence occurs in the journal description data set; in addition, a Bayesian estimation method, a maximum posterior probability estimation method, or the like, may also be used, which is not limited herein.

For function implementation of the processor provided by the embodiment of the present invention, reference may also be made to the related description of step 103 in the method for generating a journal.

In the apparatus for generating a journal, the processor is further configured to search the alignment probability set for each P(S|T) and the occurrence probability set for each P(T), where P(S|T) is an alignment probability between a source data sequence S and a journal description data sequence T, and P(T) is an occurrence probability of the journal description data sequence T in the journal description set.

When S is the source data sequence to be translated, determining that T is the target journal description data sequence which causes P(S|T)×P(T) to reach a maximum value.

For function implementation of the processor provided by the embodiment of the present invention, reference may also be made to the related description of step 104 in the method for generating a journal.

In the apparatus for generating a journal, the processor is further configured to generate, according to time identifiers included in different types of data sequences to be translated, a journal description text from each target journal description data sequence obtained according to the different types of data sequences to be translated.

Each piece of source data in the source data sequence to be translated includes a time identifier indicating when acquisition is performed. The source data in the source data sequence to be translated corresponds to the journal description data in the journal description data sequence. Such a correspondence may be that one piece of source data corresponds to one piece of journal description data, multiple pieces of source data correspond to one piece of journal description data, or one piece of source data corresponds to multiple pieces of journal description data. The specific manner of correspondence depends on a practical application. Therefore, multiple target journal description data sequences may be concatenated by using the time identifiers of the source data to form a paragraph of journal description text.

For function implementation of the processor provided by the embodiment of the present invention, reference may also be made to the related description of step 105 in the method for generating a journal.

The embodiment of the present invention is mainly applied to automatic translation and processing of a journal.

The apparatus for generating a journal according to the embodiment of the present invention may be a wireless terminal or a wired terminal, where the wireless terminal may refer to a device providing voice and/or data connectivity for a user, a hand-held device having a wireless connection function, or another processing device connected to a wireless modem. A wireless terminal may communicate with one or more core networks by using a radio access network (RAN). The wireless terminal may be a mobile terminal, such as a mobile phone (also referred to as a "cellular" phone), or a computer provided with a mobile terminal, for example, a portable, pocket-sized, handheld, computer-embedded, or vehicle-mounted mobile apparatus, which exchanges voice and/or data with a radio access network. For example, the wireless terminal may be a device such as a personal communication service (PCS) telephone, a cordless telephone, a Session Initiation Protocol (SIP) telephone, a wireless local loop (WLL) station, and a personal digital assistant (PDA). The wireless terminal may also be referred to as a system, a subscriber unit, a subscriber station, a mobile station, a mobile phone, a remote station, an access point, a remote terminal, an access terminal, a user terminal, a user agent, a user device, or a user equipment.

A person skilled in the art may clearly understand that, for convenience and brevity of description, the division of merely the foregoing functional modules is described as an example. In a practical application, functions may be assigned to and performed by different functional modules based on requirements, that is, an interior structure of the apparatus is divided into different functional modules which perform all or part of functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be another division in an actual implementation. For example, a plurality of units or components may be combined or integrated into another system, or some characteristics may be ignored or not performed. In addition, the displayed or discussed mutual couplings, or direct couplings, or communication connections may be implemented by using some interfaces. The indirect couplings or communication connections between the apparatuses or units may be implemented in electronic, mechanical, or other forms.

The units described as separate parts may or may not be physically separated, and parts displayed as units may or may not be physical units, may be located in one spot, or may be distributed on a plurality of network units. A part or all of the units may be selected based on actual needs to achieve the objectives of the solutions in the embodiments.

Based on the descriptions of the foregoing embodiments, a person skilled in the art may clearly understand that the present invention may be implemented by software with necessary common hardware. Certainly, the present invention may also be implemented by only hardware. However, the former is the preferred implementation mode. Based on such an understanding, the technical solutions of the present invention essentially, or the part contributing to the prior art may be implemented in a form of a software product. The computer software product is stored in a readable storage medium, for example, a floppy disk, hard disk, or optical disc of the computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for generating a journal, wherein the method is performed by a hardware processor in a computer, the method comprising:
    obtaining a source data set and a journal description data set corresponding to the source data set;
    calculating an alignment probability between each source data sequence in the source data set and each journal description data sequence in the journal description data set to obtain an alignment probability set, wherein the source data sequence comprises at least one piece of source data, and wherein the journal description data sequence comprises at least one piece of journal description data;
    calculating a probability that each journal description data sequence occurs in the journal description data set to obtain an occurrence probability set;
    determining, according to the alignment probability set and the occurrence probability set and from each journal description data sequence, a target journal description data sequence corresponding to a source data sequence to be translated, wherein the source data sequence to be translated is any one of a plurality of source data sequences; and
    translating the target journal description data sequence into a journal description text.

2. The method for generating the journal according to claim 1, further comprising:
    performing lexical processing on the source data in the source data set to obtain lexically processed source data; and
    performing lexical processing on the journal description data in the journal description data set to obtain lexically processed journal description data.

3. The method for generating the journal according to claim 2, wherein calculating the alignment probability between each source data sequence in the source data set and each journal description data sequence in the journal description data set to obtain the alignment probability set comprises:
    constructing a pair of parallel texts from the source data set and the journal description data set within a same preset period of time, wherein the pair of parallel texts is expressed as (S_all, T_all), wherein S_all represents the source data set in the pair of parallel texts, wherein S_all=G1, ..., Gm, wherein G1 represents a first piece of lexically processed source data in S_all, wherein Gm represents an $m^{th}$ lexically processed source data in S_all, wherein m is the number of pieces of lexically processed source data in the source data set, wherein T_all represents a journal description data set in the pair of parallel texts and T_all=A1, ..., An, wherein A1 represents a first piece of lexically processed journal description data, wherein An represents an $n^{th}$ piece of lexically processed journal description data, and wherein n is the number of pieces of lexically processed journal description data in the journal description data set; and
    calculating the alignment probability between each source data sequence and the journal description data sequence respectively corresponding to each source data sequence to obtain the alignment probability set, wherein the source data sequence comprises at least one piece of lexically processed source data in S_all, and wherein the journal description data sequence comprises at least one piece of lexically processed journal description data in T_all.

4. The method for generating the journal according to claim 2, wherein calculating the probability that each journal description data sequence occurs in the journal description data set to obtain an occurrence probability set comprises calculating the probability that each journal description data sequence occurs in the journal description data set to obtain the occurrence probability set, and wherein the journal description data sequence comprises at least one piece of the lexically processed journal description data in the journal description data set.

5. The method for generating the journal according to claim 1, wherein determining the target journal description data sequence corresponding to the source data sequence to be translated comprises:
    searching the alignment probability set for each P(S|T) and the occurrence probability set for each P(T), wherein P(S|T) is an alignment probability between a source data sequence S and a journal description data sequence T, and wherein P(T) is an occurrence probability of the journal description data sequence T in the journal description data set; and determining that T is the target journal description data sequence which causes P(S|T)×P(T) to reach a maximum value when S is the source data sequence to be translated.

6. The method for generating the journal according to claim 1, wherein translating the target journal description data sequence into the journal description text comprises generating, according to time identifiers comprised in different types of data sequences to be translated, the journal description text from each target journal description data sequence obtained according to the different types of data sequences to be translated.

7. An apparatus for generating a journal, comprising:
an obtaining module configured to obtain a source data set and a journal description data set corresponding to the source data set;
a calculating module configured to:
calculate an alignment probability between each source data sequence in the source data set and each journal description data sequence in the journal description data set to obtain an alignment probability set, wherein the source data sequence comprises at least one piece of source data, and wherein the journal description data sequence comprises at least one piece of journal description data; and
calculate a probability that each journal description data sequence occurs in the journal description data set to obtain an occurrence probability set;
a translating module configured to determine, according to the alignment probability set and the occurrence probability set and from each journal description data sequence, a target journal description data sequence corresponding to the source data sequence to be translated, wherein the source data sequence to be translated is any one of a plurality of source data sequences; and
a journal generating module configured to generate a journal description text according to the target journal description data sequence.

8. The apparatus for generating the journal according to claim 7, further comprising a lexical processing module configured to:
perform lexical processing on the source data in the source data set to obtain lexically processed source data; and
perform lexical processing on the journal description data in the journal description data set to obtain lexically processed journal description data.

9. The apparatus for generating the journal according to claim 8, wherein the calculating module is further configured to:
construct a pair of parallel texts from the source data set and the journal description data set within a same preset period of time, wherein the pair of parallel texts is expressed as (S_all, T_all), wherein S_all represents a source data set in the pair of parallel texts, wherein S_all=G1, . . . , Gm, wherein G1 represents a first piece of lexically processed source data in S_all, wherein Gm represents an $m^{th}$ lexically processed source data in S_all, wherein m is the number of pieces of lexically processed source data in the source data set, wherein T_all represents a journal description data set in the pair of parallel texts and T_all=A1, . . . , An, wherein A1 represents a first piece of lexically processed journal description data, wherein An represents an $n^{th}$ piece of lexically processed journal description data, and wherein n is the number of pieces of lexically processed journal description data in the journal description data set; and
calculate the alignment probability between each source data sequence and the journal description data sequence respectively corresponding to each source data sequence to obtain the alignment probability set, wherein the source data sequence comprises at least one piece of lexically processed source data in S_all, and wherein the journal description data sequence comprises at least one piece of lexically processed journal description data in T_all.

10. The apparatus for generating the journal according to claim 8, wherein the calculating module is further configured to calculate the probability that each journal description data sequence occurs in the journal description data set to obtain the occurrence probability set, and wherein the journal description data sequence comprises at least one piece of the lexically processed journal description data in the journal description data set.

11. The apparatus for generating the journal according to claim 7, wherein the translating module is further configured to:
search the alignment probability set for each P(S|T) and the occurrence probability set for each P(T), wherein P(S|T) is the alignment probability between a source data sequence S and a journal description data sequence T, and wherein P(T) is an occurrence probability of the journal description data sequence T in the journal description set; and
determine that T is the target journal description data which causes P(S|T)×P(T) to reach a maximum value when S is the source data sequence to be translated.

12. The apparatus for generating the journal according to claim 7, wherein the journal generating module is further configured to generate, according to time identifiers comprised in different types of data sequences to be translated, the journal description text from each target journal description data sequence obtained according to the different types of data sequences to be translated.

13. An apparatus for generating a journal, comprising:
a memory configured to store program code; and
a processor coupled to the memory, wherein the program code is configured to cause the processor to:
obtain a source data set and a journal description data set corresponding to the source data set;
calculate an alignment probability between each source data sequence in the source data set and each journal description data sequence in the journal description data set to obtain the alignment probability set, wherein the source data sequence comprises at least one piece of source data, and wherein the journal description data sequence comprises at least one piece of journal description data;
calculate a probability that each journal description data sequence occurs in the journal description data set to obtain an occurrence probability set;
determine, according to the alignment probability set and the occurrence probability set and from each journal description data sequence, a target journal description data sequence corresponding to a source data sequence to be translated, wherein the source data sequence to be translated is any one of a plurality of source data sequences; and
generate a journal description text according to the target journal description data sequence.

14. The apparatus for generating the journal according to claim 13, wherein the processor is further configured to:
perform lexical processing on the source data in the source data set to obtain lexically processed source data; and perform lexical processing on the journal description data in the journal description data set to obtain lexically processed journal description data.

15. The apparatus for generating the journal according to claim 14, wherein the processor is further configured to:

construct a pair of parallel texts from the source data set and the journal description data set within a same preset period of time, wherein the pair of parallel texts is expressed as (S_all, T_all), wherein S_all represents a source data set in the pair of parallel texts, wherein S_all=G1, . . . , Gm, wherein G1 represents a first piece of lexically processed source data in S_all, wherein Gm represents an $m^{th}$ lexically processed source data in S_all, wherein m is the number of pieces of lexically processed source data in the source data set, wherein T_all represents a journal description data set in the pair of parallel texts, wherein T_all=A1, . . . , An, wherein A1 represents a first piece of lexically processed journal description data, wherein An represents an $n^{th}$ piece of lexically processed journal description data, and wherein n is the number of pieces of lexically processed journal description data in the journal description data set; and calculate the alignment probability between each source data sequence and the journal description data sequence respectively corresponding to each source data sequence to obtain the alignment probability set, wherein the source data sequence comprises at least one piece of lexically processed source data in S_all, and wherein the journal description data sequence comprises at least one piece of lexically processed journal description data in T_all.

16. The apparatus for generating the journal according to claim 14, wherein the processor is further configured to calculate the probability that each journal description data sequence occurs in the journal description data set to obtain the occurrence probability set, and wherein the journal description data sequence comprises at least one piece of the lexically processed journal description data in the journal description data set.

17. The apparatus for generating the journal according to claim 13, wherein the processor is further configured to:

search the alignment probability set for each P(S|T) and the occurrence probability set for each P(T), wherein P(S|T) is the alignment probability between a source data sequence S and a journal description data sequence T, and wherein P(T) is an occurrence probability of the journal description data sequence T in the journal description set; and determine that T is the target journal description data sequence which causes P(S|T)×P(T) to reach a maximum value when S is the source data sequence to be translated.

18. The apparatus for generating the journal according to claim 13, wherein the processor is further configured to generate, according to time identifiers comprised in different types of data sequences to be translated, the journal description text from each target journal description data sequence obtained according to the different types of data sequences to be translated.

* * * * *